Figure 1:
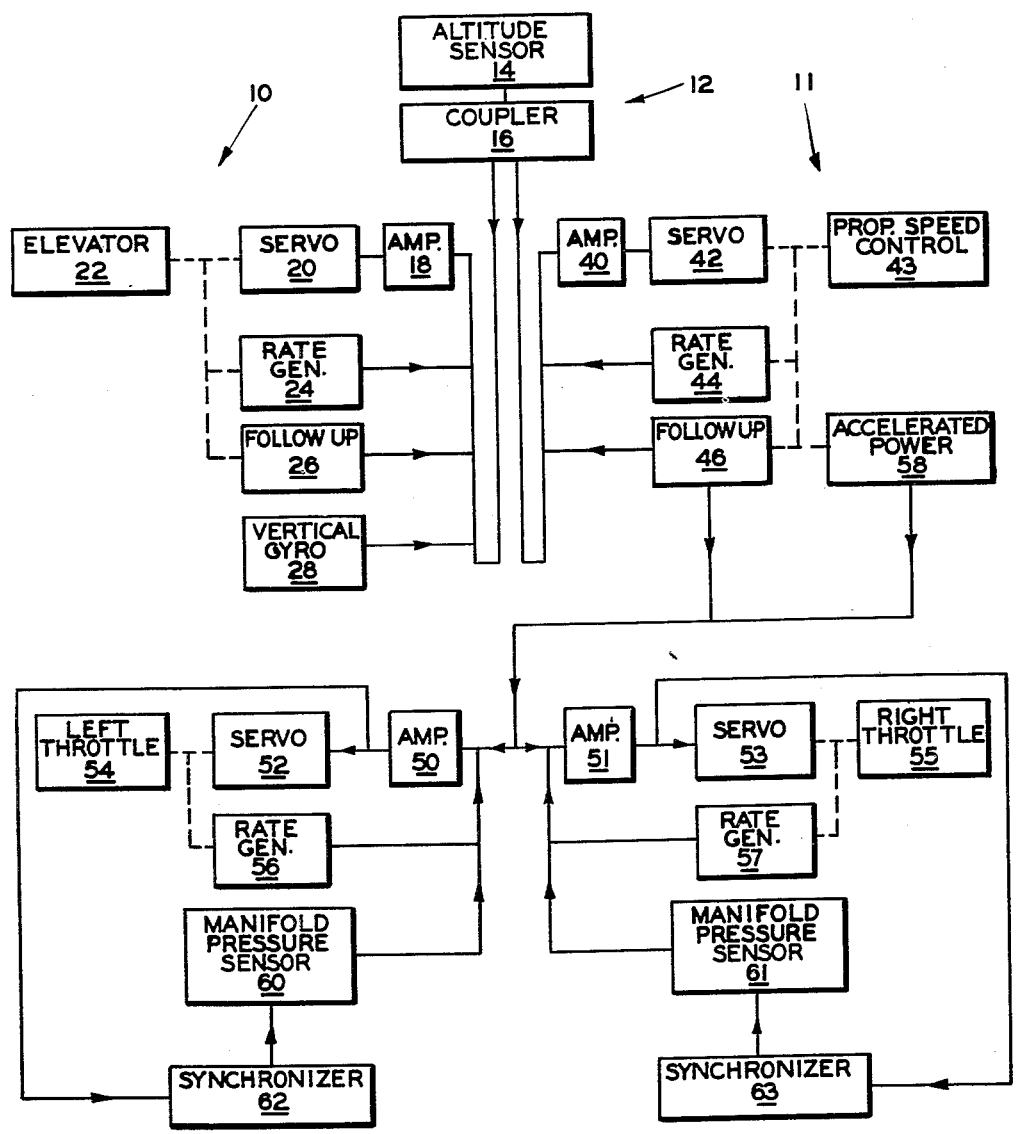

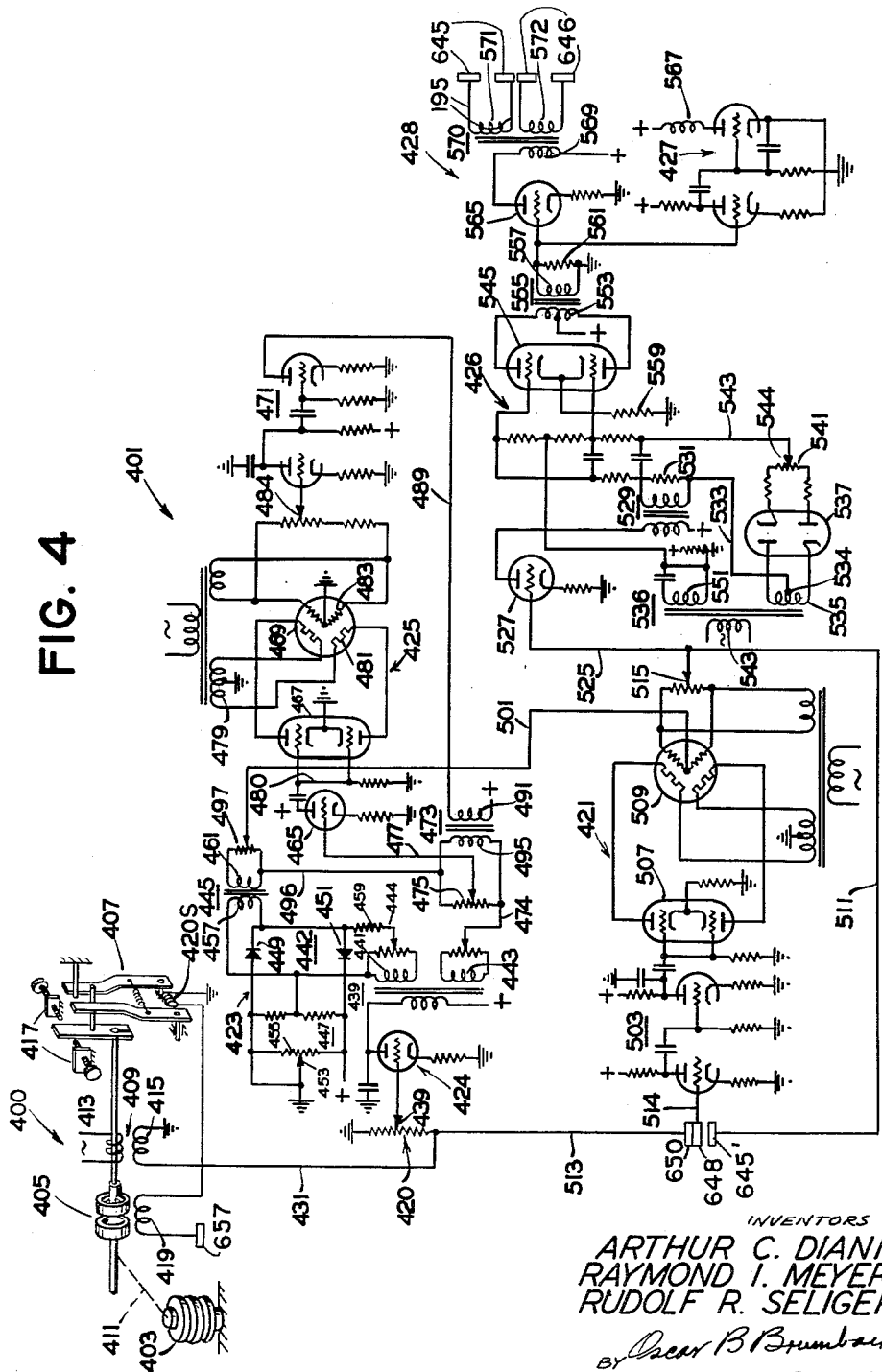

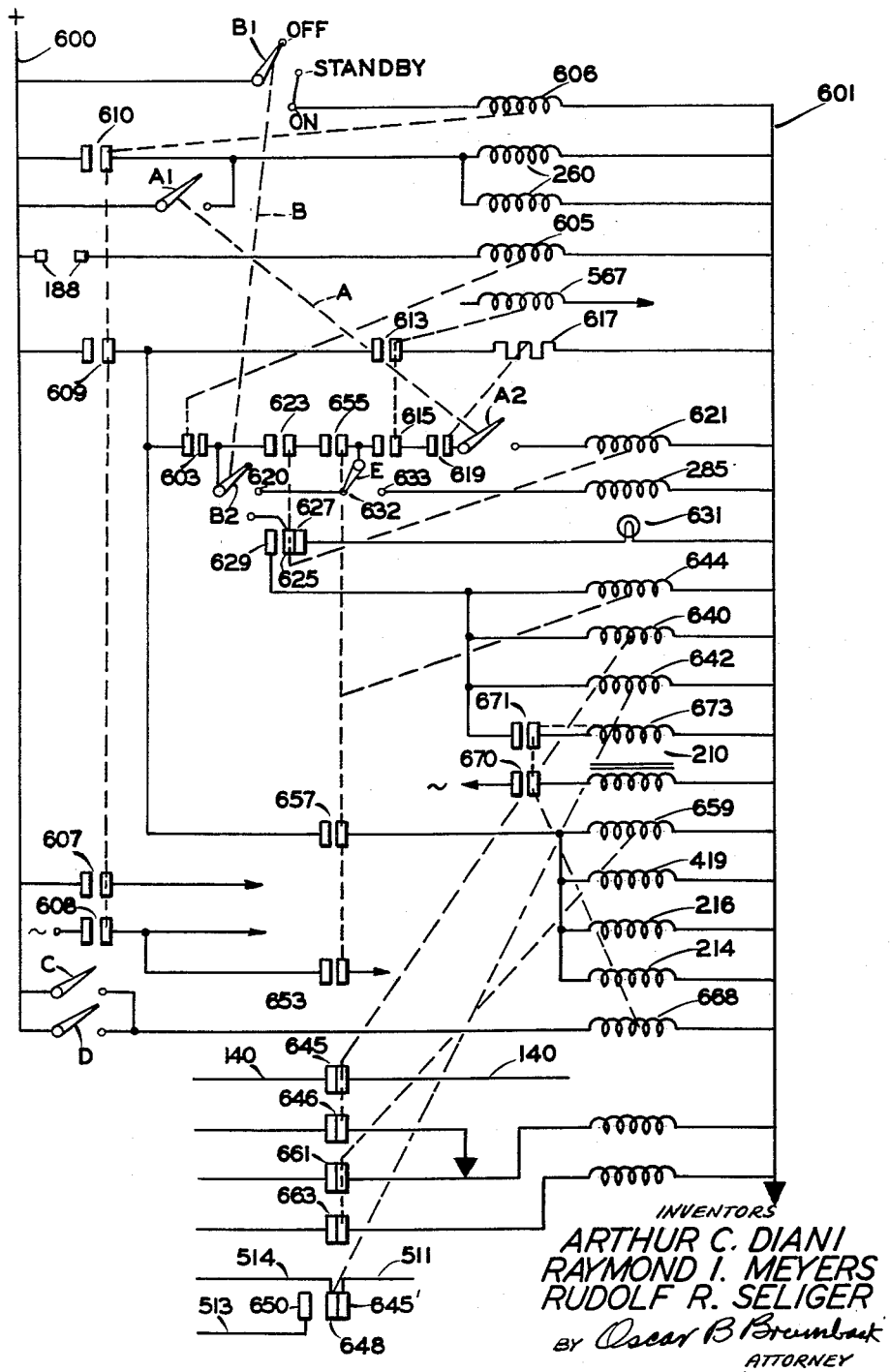

United States Patent Office 2,961,200
Patented Nov. 22, 1960

2,961,200

ALTITUDE CONTROL SYSTEM FOR AIRCRAFT

Rudolf R. Seliger, Palisades Park, Arthur C. Diani, Hasbrouck Heights, and Raymond I. Meyers, Clifton, N.J., assignors to The Bendix Corporation, a corporation of Delaware Filed Nov. 13, 1953, Ser. No. 391,992

15 Claims. (Cl. 244—77)

This invention relates generally to control systems and more particularly to control systems for maintaining aircraft at constant altitudes.

Although an aircraft tends to maintain a condition of level flight when the lift developed by its wings is equal to its weight, its altitude level may vary because of various conditions such as updrafts or downdrafts. Since the weight of a craft is substantially constant, the lift may be varied to fly the craft at a constant altitude.

Th lift developed by the wings of a craft may be considered to be a function of two controllable variables: angle of attack and airspeed. Angle of attack may be controlled by changing the pitch attitude of the craft, and airspeed by changing the thrust developed by the motors of the craft. Changing the airspeed by varying the thrust of the motors, however, requires an interval of time since it is difficult to overcome inertia in accelerating or decelerating a body from one velocity to another. In contrast, the angle of attack may be changed quickly by varying the pitch attitude of the craft.

Pitch attitude also exerts a marked influence on airspeed; with the same throttle setting the airspeed of a craft will be greater when it is diving than when it is climbing. Thus, intolerably fast or slow velocities may result from pitch attitude alone. For the most efficient operation of the craft, therefore, the pitch attitude and thrust of the craft should be coordinated.

Automatic control systems, which have been used heretofore to maintain aircraft at constant altitudes, have controlled the pitch attitude of the craft automatically; and the human pilot has controlled the thrust manually. These systems worked well, although two disadvantages were presented. First, an additional operation was imposed on the attention of the human pilot. Secondly, precise altitude control was difficult since the craft, due to the influence of the pitch attitude on the airspeed, reaches the desired altitude at a more rapid rate when the displacement of craft is above the desired altitude level than when the displacement is below. Manually compensating for the changes in velocity of the craft as it reaches the desired altitude level, due to the direction of displacement from the level, is difficult.

An object of the present invention, therefore, is to provide a novel apparatus for maintaining an aircraft at a predetermined altitude level by coordinating pitch attitude and thrust.

Another object is to provide a novel thrust control system for aircraft.

A further object is to provide a novel altitude controller for developing signals corresponding to the rate and integral of an altitude displacement signal.

Another object is to provide a novel controller for increasing the thrust of the remaining powerplants of an aircraft when one powerplant fails.

A still further object of the invention is to provide a novel controller for maintaining the craft at a constant altitude and airspeed.

The present invention contemplates a novel automatic pilot system which, by signals corresponding to displacement from a desired altitude and to the time integral and rate of change thereof, controls the pitch attitude of a craft and the thrust of its motors. Thus the novel system tends to maintain a desired airspeed when making correction for errors in altitude, automatically adjusting the thrust of the motor in relation to the pitch attitude changes.

The foregoing and oher objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only, and are not intended as a definition of the limits of the invention.

Figure 2:
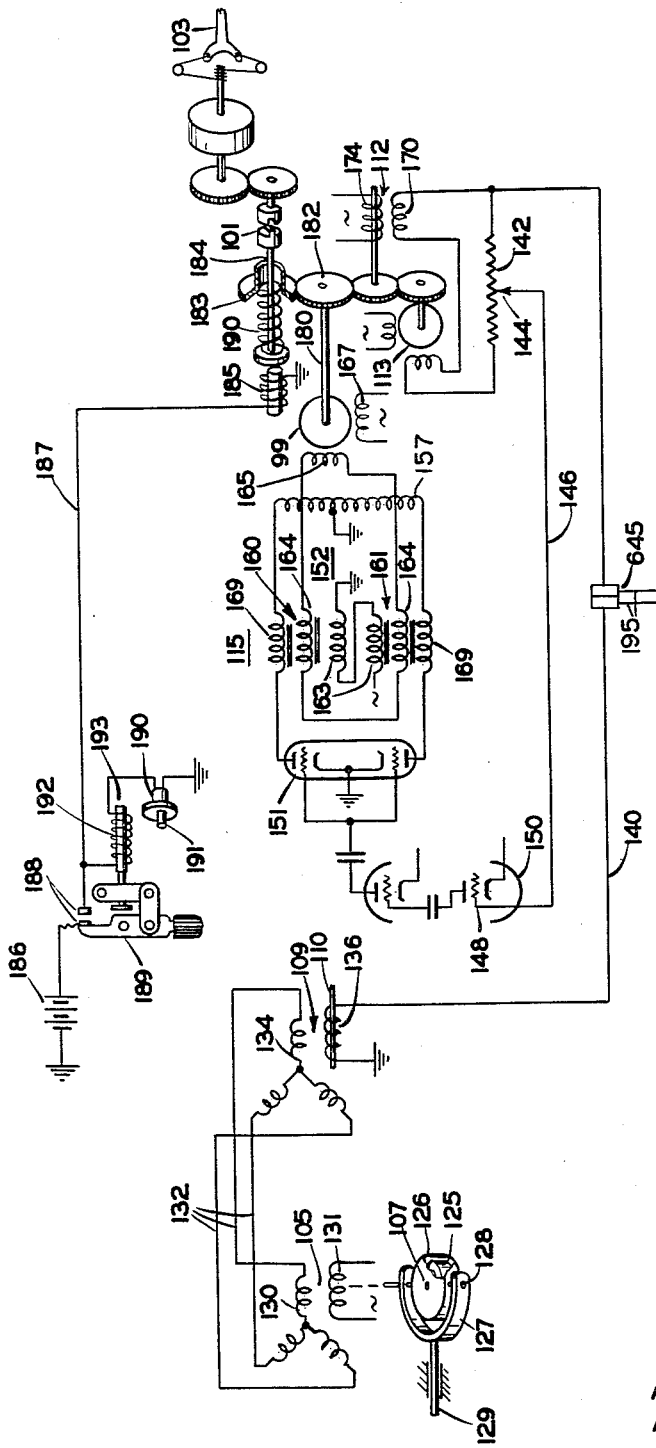
Figure 3:
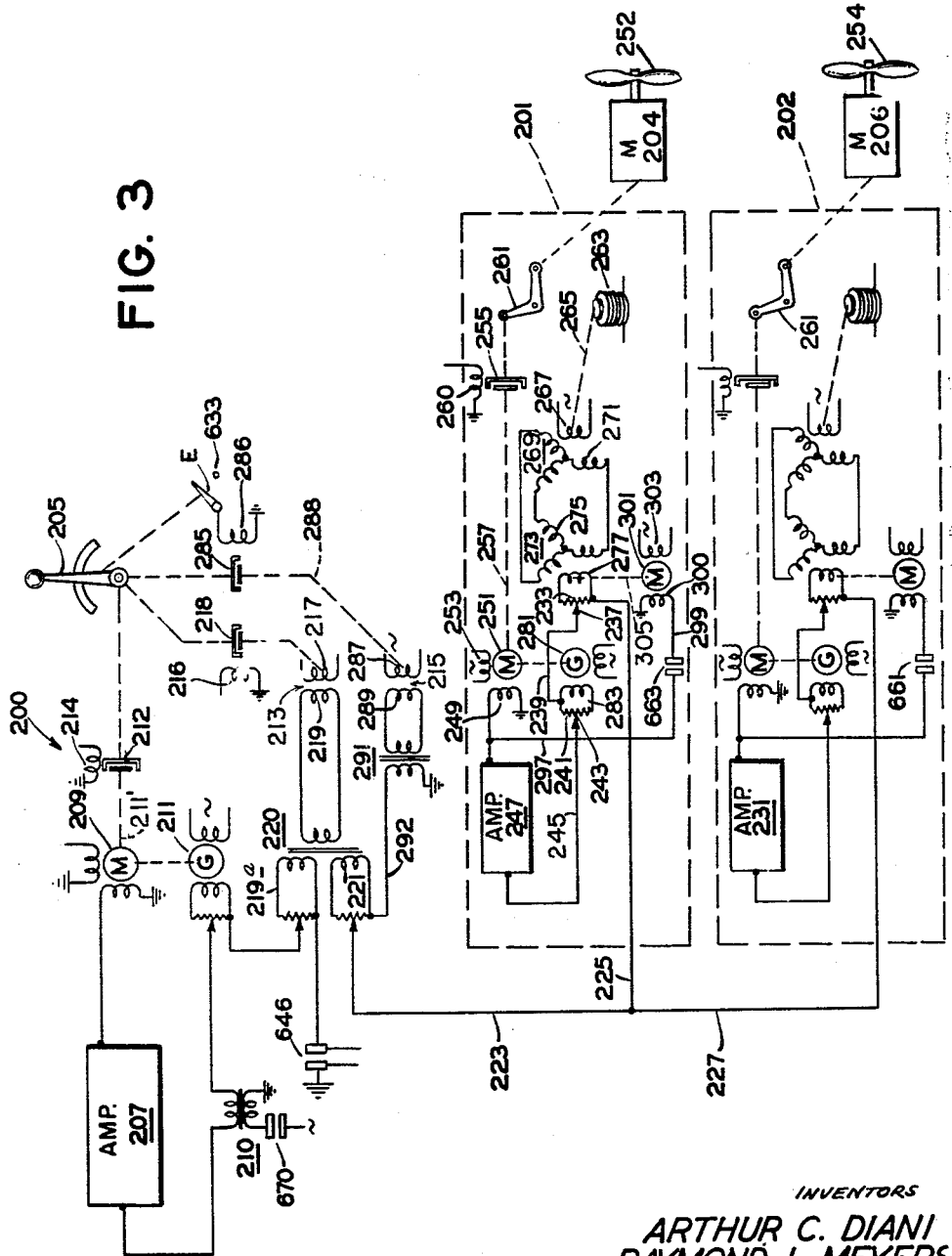

In the drawings wherein like parts are numbered alike:
Fig. 1 is a general schematic block diagram of the novel altitude retention automatic pilot system of the present invention;
Fig. 2 is a schematic illustration of an operative embodiment of a pitch control channel as shown in Figure 1;
Fig. 3 is a schematic illustration of an operative embodiment of a thrust control channel as shown in Figure 1;
Fig. 4 is a schematic illustration of an operative embodiment of an altitude controller as shown in in Figure 1; and
Fig. 5 is a schematic wiring diagram of the relay system operative with the embodiments shown in Figures 2, 3 and 4.

The novel altitude retention system of the preesnt invention, as shown in a general fashion in schematic block form in Figure 1, is comprised generally of three units: a pitch control channel 10, a thrust control channel 11, and an altitude controller 12.

The altitude controller is comprised generally of an altitude sensor 14 and a coupler unit 16. Upon a change in altitude of the craft from a predetermined altitude, the altitude sensor 14 develops a corresponding output to which coupler 16 responds and develops outputs for the pitch control and thrust control channels.

In pitch control channel 10, the output of the coupler is amplified and its phase detected in an amplifier 18 whose resulting output energizes a servomotor 20. This servomotor actuates an elevator surface 22, a rate generator 24 and a follow-up 26. Rate generator 24 develops an output corresponding to the velocity of the servomotor. This output, when fed back to the input of amplifier 18, keeps the servomotor from overrunning an ordered position because of the kinetic energy stored as inertia of motion. Follow-up 26 develops an output corresponding to the position of the elevator surface. This output opposes the input signal so that the response of the servomotor will correspond to the magnitude of the input signal. A vertical gyro 28 measures the response of the aircraft to the commands of altitude controller 12.

In thrust control channel 11, the output of coupler 16 is amplified and its phase detected in an amplifier 40 whose output energizes a servomotor 42. This servomotor actuates a propeller speed controller 43, a rate generator 44, and a follow-up 46. The rate generator develops an output corresponding to the velocity of the servomotor. This output, when fed back to amplifier 40 keeps the servomotor from overrunning its ordered position because of kinetic energy stored as inertia of movement. The follow-up develops an output corresponding to the position of the propeller speed controller.

This output opposes the control signal so that the response of servomotor 42 in positioning the propeller speed controller will correspond to the control signal.

For each propeller speed, a related manifold pressure exists which must be maintained to get maximum efficiency from the engine driving the propeller. Since the output of follow-up 46 corresponds to the position of propeller speed controller 43, it is used to control the throttles which regulate the manifold pressure, this output being applied to the servomotors for both the left and right throttles in aircraft having two powerplants. Accordingly, the output of a follow-up 46 is applied to amplifiers 50 and 51 whose output operates the servomotors 52 and 53 which position throttles 54 and 55. These motors also operate rate generators 56 and 57 whose outputs, when fed back to the inputs of their respective amplifiers, keep the motors from overrunning their ordered positions due to kinetic energy.

Although the relationship between the positions of the propeller speed controller and the resulting manifold pressure is not a linear function, this does not result in appreciable error at low propeller speeds. The error becomes pronounced, however, at higher speeds. Therefore, another position reference 58 is rendered operative at higher propeller speeds to provide an additional signal for servomotors 52 and 53.

Now, the condition to be controlled is not the throttle position but is the manifold air pressure; throttle position being the means for controlling the manifold pressure. Accordingly, devices 60 and 61 are provided to develop outputs corresponding to the manifold pressure. These outputs are fed back to the inputs of amplifiers 50 and 51 so that motors 52 and 53 will stop when the throttles have been opened an amount such that the output of devices 60 and 61 is equal and opposite to the input from follow-up 46 and accelerated power device 58 if the latter is operative.

Since the engines of the aircraft will be operating when the altitude controller is engaged, synchronizers 62 and 63 are provided to precondition the system to take over automatic control smoothly.

Figure 2 illustrates an operative embodiment of a pitch control channel such as that shown in block diagram form in Figure 1. This control channel may be generally similar to that described in U.S. Patent No. 2,625,348, issued January 13, 1953 to P. A. Noxon et al.

The pitch control channel herein is comprised generally of a servomotor 99, a solenoid operated clutch 101 for connecting and disconnecting the servomotor from an elevator surface 103, an inductive device 105 operatively connected with a vertical gyro 107 for developing a pitch attitude signal, an inductive device 109 operatively connected with the shaft 110 of a manual controller for developing a signal to change the pitch attitude of the craft, an inductive device 112 for developing a follow-up signal corresponding to the displacement of elevator surface 103 from a normal position, a rate generator 113 for developing a signal corresponding to the rate of operation of the servometer, and a servo amplifier 115 for receiving the signals and developing an output for the servomotor.

Vertical gyro 107 may be a conventional type in which a rotor 125 is mounted in a suitable bearing frame 126 and spins about a normally vertical axis. Bearing frame 126 is supported within a gimbal ring 127 by trunnions 128 for oscillation about a first horizontal axis, and the gimbal ring is supported by outer trunnion 129 for oscillation about a second horizontal axis perpendicular to the first axis. Trunnion 129 is arranged for measuring displacement of the craft about the bank axis, i.e., the fore and aft axis of the craft; and trunnions 128 are arranged for measuring displacement about the pitch axis, i.e., the transverse axis of the craft.

Pick-off device 105 for generating an electric signal proportional to the angle of pitch of the craft is an inductive transmitter device having a three-phase wound stator winding 130 fixed to the craft and a single-phase rotor winding 131 mounted on trunnion 128. Rotor winding 131 is energized by a suitable source of alternating current; and the voltages induced in each stator winding, when the craft is in its normal pitch attitude, depend upon the angular position of each winding relative to the rotor winding.

Transmitting stator winding 130 is connected by suitable conductors 132 with a three-phase wound stator winding 134 of inductive device 109. The normal position of the rotor winding 136, which is inductively associated with stator winding 134, is such that its electrical field is perpendicular to the resultant of the magnetic field stator 134. So that the pitch attitude may be changed, this rotor is supported by a shaft 110 for angular displacement relative to the stator by a manual controller (not shown) which may be generally similar to that described in U.S. Patent No. 2,618,446, issued November 18, 1952, to F. H. S. Rossire.

A change in the pitch attitude of the craft, causes transmitter rotor 131 to move with trunnion 128 angularly with respect to stator 130, changing the voltages induced in the windings of the stator. Transmitting these changed voltages to stator windings 134 causes the resultant magnetic field at this stator to revolve relative to receiver rotor 136, and a signal proportional to the amount of change of pitch attitude is induced within rotor winding 136. By way of a suitable conductor 140, this signal is impressed across a resistor 142 which is connected by way of a wiper 144 and a conductor 146 with the grid 148 of a vacuum tube 150 in amplifier 115.

Amplifier 115 is comprised generally of a twin triode type vacuum tube amplifier 150, a discriminator 151, and a magnetic amplifier 152. At amplifier 150, the signal receives two stages of amplification; and the amplified output, which is still synchronized with the phase of the input signal, is applied to the grids of twin triode tube 151.

Tube 151 constitutes a phase discriminator. The voltage for each plate of tube 151 is supplied from the end terminals of a center tapped secondary winding 157 of a transformer whose primary winding is not shown. Plate current will flow through one section or the other of the tube, depending upon the phase of the signal on the grid. This plate current is used to control the output of magnetic amplifier 152 which, in turn, controls the operation of servomotor 99.

Magnetic amplifier 152 is comprised of two saturable transformers 160 and 161. Each transformer has three windings: a primary winding, a secondary winding, and a control winding. Primary windings 163 are connected in series aiding and are energized from a suitable alternating current source. Secondary windings 164 are connected in series opposition and form a closed circuit with the variable field winding 165 of the servomotor 99 which may be a conventional type having a fixed field winding 167 continuously energized. Each of the control windings 169 is connected to a plate of discriminator tube 151.

When no current is flowing through either portion of the discriminator tube the two transformers are saturated alike so the two voltages induced in secondary windings 164 are equal. Since these windings are connected in series opposition, the two equal induced voltages are opposite in phase in the same circuit; therefore, no resultant current flows. When a current flows from either plate of discriminator 151, the transformer core which it feeds tends to become magnetically saturated. Since this correspondingly cuts down the induction in the secondary of that transformer, the opposing voltage from the other transformer will prevail. As a result, a current will flow through the circuit energizing the variable field winding 165 and operating servomotor 99. The direction of rotation of the motor, of course, depends upon which section of the discriminator tube is conducting.

Follow-up device 112 is provided so that the displacement of the elevator surface from its normal position and the displacement of the craft from the predetermined attitude will correspond. This may be an inductive pick-off device having an energized stator winding 170 fixed with the craft and a rotor winding 174 which is adapted to be turned through a suitable gear train by servomotor 99. Since the null position of inductive device 112 corresponds to the normal position of elevator surface 103, any displacement of the elevator surface by servomotor 99 develops a corresponding signal at stator winding 170 due to the displacement of rotor winding 174. This follow-up signal is in opposition to the displacement signal; when its amplitude is equal to the amplitude of the attitude signal, the net input to amplifier 115 is zero; motor 99 stops and elevator surface 103 is displaced sufficiently to correct for the craft displacement.

Due to the kinetic energy stored as inertia in the moving parts, motor 99 tends to overrun its assigned position. Therefore, a conventional rate generator 113 is provided to develop a velocity signal corresponding to the speed of operation of servomotor. This generator may be a conventional type having two spaced field windings: one being continuously energized and the other having a signal developed therein when the rotor of the generator is turned by servomotor 99.

To displace the elevator surface 103, motor 99 is provided with a shaft 180 carrying a pinion 182 for meshing with a gear 183 which is keyed to a shaft 184 in a manner so that the shaft may be moved longitudinally relative to the gear. To move the shaft, one end is associated with the core of a solenoid 185. The winding of solenoid 185 has one end grounded and the other end connected with a battery 186 through a suitable conductor 187, and the contacts 188 of an engage switch 189. When this switch is in its "on" position, contacts 188 close; and solenoid 185 is energized, forcing its core outwardly against the action of a spring 190, interposed between gear 183 and an enlarged portion of shaft 184. This moves the shaft outwardly so that the one face of clutch 101, which is fastened to it, engages a mating face and establishes a driving connection between servomotor 99 and elevator 103.

Should the human pilot wish to disconnect the automatic pilot system so as to control the craft manually, he opens switch 189. This deenergizes solenoid 185, and the faces of clutch 101 disengage. A pilot's quick disconnect switch 190 also may be provided on the pilot's wheel so that if he desires to deenergize servo clutch 101, he depresses a button 191. This forms a closed circuit from battery 186 through a coil 192 to ground. Energizing coil 192 urges a core 193 outwardly to open engage switch 189. Although coil 192 is deenergized as soon as switch 189 is opened, the switch does not close; this requires a direct manual operation.

In the operation of the pitch control channel, the input to servo amplifier 115 is zero when the inductive pick-off devices in the pitch channel are in their null positions, a condition occurring when the craft is flying at the desired attitude. Displacement of the craft from this attitude causes a movement of rotor 131 relative to stator 130 of inductive device 105. The amplitude of the pitch attitude signal developed is proportional to the angle of the pitch attitude relative to the desired attitude; the phase of the signal is determined by the direction, up or down, of the displacement. This attitude signal is applied to amplifier 115 where its phase is detected and an output developed to energize servomotor 99. Depending upon the phase of the attitude signal, the servomotor turns in a clockwise or counterclockwise direction in moving elevator surface 103 to correct the pitch attitude.

The operation of servomotor 99 displaces rotor winding 174 of follow-up device 112 relative to stator winding 170 and builds up a follow-up signal which, being opposite in phase to the pitch attitude signal, reduces and finally cancels the attitude signal. With a net input signal of zero to amplifier 115, motor 99 stops with elevator surface 103 displaced. As this displacement returns the craft to the desired pitch attitude, the attitude signal decreases and the follow-up signal causes the return of the elevator surface to its normal position.

Leads 195 have been shown for connecting the novel coupler of the present invention into the pitch control channel. However, since the coupler is shorted from the control channel by the engagement of contacts 645 when the coupler is not engaged, the channel will function as above described when the coupler is in an "off" or "stand-by" condition.

The foregoing is intended to represent a conventional pitch control channel which can control the pitch attitude of the craft and affect its angle of attack. As previously discussed, the lift also is a function of the airspeed of a craft and the pitch attitude influences the airspeed. In accordance with the present invention, the thrust of the craft's engines is also controlled.

Turning now to the novel thrust control channel, Figure 3 illustrates an operative embodiment of the thrust control channel of Figure 1. For a twin engine aircraft, this channel is comprised of three sub-systems: a propeller speed control system 200; and two throttle control systems 201 and 202, i.e., one for each engine 204, 206. The servo amplifiers of these sub-systems may be similar to amplifier 115, and the servomotors may be conventional induction motors.

The propeller speed control sub-system is comprised generally of a propeller speed controller lever 205, an amplifier 207, a servomotor 209, a rate generator 211, and a pair of position transmitters 213 and 215. Amplifier 207, in response to an input signal, develops an output which operates servomotor 209 in a clockwise or counterclockwise direction, depending upon the phase of the input signal. Servomotor 209 through a suitable mechanical connection 211' and a magnetic clutch 212, when its coil 214 is energized, operates the propeller speed controller 205.

To control speed controller 205, its position must be known. Position transmitters 213 and 215 supply this information. These may be conventional inductive devices, each having a stator fixed with the craft and an energized rotor mechanically connected through a magnetic clutch to the speed controller.

Inductive device 213 operates as a conventional follow-up. When the coil 216 of magnetic clutch 218 is energized so that the clutch is engaged, the displacement of rotor 217 relative to stator 219 develops in the stator a corresponding signal. By way of a secondary winding 219a of a coupling transformer 220, this signal is fed back in phase opposition to the input signal to amplifier 207. Consequently, the net input signal to amplifier 207 is zero, when speed controller 205 has been moved to a position such that the signal from follow-up 213 is equal and opposite to the command signal to amplifier 207. A conventional rate generator 211 driven by motor 209 develops a velocity feedback signal corresponding to the speed of operation of the motor so that the latter will not overrun its ordered position.

Occasionally, one engine fails, and the other must supply more thrust to keep the craft aloft. Should this occur, a constant source of alternating current is coupled by way of coupling transformer 210 into the input of amplifier 207 to drive the speed controller to an advanced position.

Increasing the propeller speed requires a change in the schedule of manifold pressures to obtain maximum efficiency of the engines. In order to develop a signal corresponding to the position of the speed controller 205, another secondary winding 221 is associated with coupling transformer 220. The signal developed in this secondary winding is applied by way of lead 223 and parallel connected leads 225 and 227 to the servo amplifiers 247 and 231 controlling the throttle mechanisms or carburetor arms of the craft. Since the control system for each throttle is identical, only one will be discussed in detail.

The speed controller position signal from lead 223 is applied by way of lead 225 across a potentiometer 233 whose wiper 237 is connected by way of a lead 239 to a second potentiometer 241 whose wiper 243, in turn, is connected by a lead 245 to the input of an amplifier 247. The output of amplifier 247 energizes the variable phase field winding 249 of a servomotor 251 whose fixed phase field winding 253 is continuously energized when the altitude control system is being operated. Motor 251 through a suitable mechanical connection 257 and a magnetic clutch 255, when its coil 260 is energized, positions the throttle or carburetor arm 261 which controls the speed of the associated motor 204, 206 and propeller 252, 254 in a conventional manner.

To control the aircraft engines properly, the manifold pressure at any instant must be known. To this end, a conventional aneroid bellows 263 that moves in response to changes in pressure in the manifold line is provided. By a suitable mechanical connection 265, this movement displaces the energized rotor winding 267 of an inductive device 269 relative to its stator winding 271.

Inductive devices 269 and 273 constitute a transmitter and receiver. Stator windings 271 and 275 are connected in parallel, and potentiometer 233 is connected across the rotor winding 277. When an error exists in the relative positions of rotor windings 267 and 277, the error signal is fed to the input of amplifier 247. This error signal is in phase opposition to the signal from winding 221 of coupling transformer 220.

In response to an output from amplifier 247, servomotor 251 moves throttle 261 to a position such that the error signal between rotor windings 267 and 277 is equal and opposite to the input signal from lead 223 to amplifier 247. At this time, the net input signal is zero and servomotor 251 stops with throttle 261 displaced. A conventional rate generator 281 is provided so that kinetic energy will not cause motor 251 to overrun its ordered position. Potentiometer 241 is connected across the output winding 283 of rate generator 281.

At higher propeller speeds, the manifold pressure schedule may not vary linearly with the propeller speed. Accordingly, a second position transmitter 215 is connected through a magnetic clutch 285 and a suitable mechanical connection 288 to the propeller speed controller 205. When the speed controller reaches a position where the deviation from a linear pressure relationship becomes pronounced, a switch E is moved to a closed circuit position. This engages a magnetic clutch 285 by energizing its coil 286. Thereafter, displacement of the speed controller displaces the rotor winding 287 of inductive device 215 relative to stator winding 289 to develop a signal which, by way of coupling transformer 291 and lead 292, is added to the signal at winding 221 from the stator winding 219.

So that a smooth transition may be made from manual to automatic control, and so that the pilot may set up suitable manifold air pressure to propeller speed relationship prior to engaging the altitude controller, a synchronizing system is provided for the throttles. To this end the output from amplifier 247 is applied by way of lead 297, contacts 663 and lead 299 to the variable phase winding 300 of an induction motor 301 whose fixed phase winding 303 is continuously energized when the novel altitude control system is not engaged. Motor 301 is connected by a suitable mechanical connection 305 to rotor winding 277.

When the craft is being manually controlled and the automatic control system is disengaged, aneroid 263 is still actively responding to the pressure existing in the manifold and displacing rotor winding 267. The error signal developed at rotor winding 277 is applied to amplifier 247 and the corresponding output developed operates motor 301 which displaces rotor winding 277 so as to cancel the error signal. Thus, synchronization is maintained between the positions of rotor windings 267 and 277 when the aircraft is being manually controlled. Accordingly, the transition, when the aircraft is engaged for automatic control, takes place smoothly.

The command signals fed to the pitch and thrust control channels by the disengagement of contacts 645 and 646 are derived from a novel altitude controller. As shown in Figure 4, an operative embodiment of the altitude controller of Figure 1 may be comprised generally of an altitude responsive device 400 and a coupler 401.

Altitude responsive device 400 may be of the type described in U.S. Patent No. 2,512,902, issued June 27, 1950, to F. H. S. Rossire; the embodiment herein being comprised of an aneroid 403, a magnetic clutch 405, a centering mechanism 407, and an inductive signal generator 409. A mechanical linkage 411 transforms the linear movement of aneroid 403 into a rotary movement at one face of the magnetic clutch 405. Upon engagement of the clutch, this rotary movement is imparted to the rotor winding 413 of inductive signal generating device 409 to develop a corresponding signal in stator winding 415. When the clutch is disengaged centering mechanism 407 returns the rotor winding to a null position. This centering mechanism may be similar to that described in copending application Serial No. 154,567, now abandoned, assigned to the assignee of the present invention. Adjustable mechanical stops 417 restrict the motion of rotor winding 413 to limit the maximum signal developed.

When the craft has reached the predetermined altitude, clutch coil 419 and solenoid 420s are energized. Coil 419 engages the faces of clutch 405, and solenoid 420s opens the levers of centering mechanism 407. Thereafter, any change in altitude of the craft results in the development of a corresponding signal.

Coupler 401 is comprised generally of an input 420, a centering circuit 421, a preamplifier 424, a displacement limiter 423, a rate deriving circuit 425, a converter limiter 426, an alarm circuit 427 and an output isolation circuit 428.

When the craft deviates from the predetermined altitude, the altitude displacement signal is applied by way of lead 431 to input 420 which may be a conventional voltage divider. Full displacement signal is applied to an amplifier 503 of centering circuit 421, and an adjusted portion of the displacement signal from wiper 438 is applied to preamplifier 424 of the rate and displacement circuits.

Considering first the action of the rate and displacement circuits, the output of preamplifier 424 is applied across a coupling transformer 439 having two secondary windings: secondary winding 441 is the input for a displacement signal circuit 442, and secondary winding 443 is the input for a rate circuit 425. The signals from these circuits are combined at a mixing transformer 445.

In displacement circuit 442, the altitude displacement signal from wiper 444 is fed to displacement limiter 423 which may be of the type described more fully in copending application Serial No. 187,807 assigned to the assignee of the present invention and now Patent No. 2,683,226, issued July 6, 1954. The embodiment herein is comprised of a suitable direct current source for energizing a resistance network 447 and two diode rectifiers 449 and 451.

When the amplitudes of the alternating current displacement signals are lower than the direct current blocking voltage, none of the displacement signal voltages will pass through the circuits formed by diodes 449 and 451. The full signal voltage at this time will be impressed on the primary winding 457 of mixing transformer 445. When the signal voltage exceeds the magnitude of the direct current blocking voltage, the excess voltage bleeds off through the diode circuits. This causes a voltage drop across a series resistor 459, thus limiting the signal voltage appearing at the primary winding 457. Wiper 453 of potentiometer 455, by adjusting the magnitude of the direct current voltage, determines the maximum value of the displacement signal that is passed to primary winding 457 of mixing transformer 445 where it is algebraically added to the rate signal applied to secondary winding 461 from rate circuit 425.

Rate circuit 425 may be generally similar to the circuit described in copending application Serial No. 90,236 now U.S. Patent No. 2,754,418, assigned to the assignee of the present invention. The circuit herein is comprised generally of a preamplifier 465, a discriminator 467, a thermal time delay device 469, a post amplifier 471, and a feedback transformer 473.

The displacement signal from secondary winding 443 is applied by way of a lead 474, a potentiometer 475, and a lead 477 to preamplifier 465 whose output is applied to a twin triode 467 which operates as a phase discriminator, the plates of this discriminator being energized from the opposite ends of a center tapped secondary winding 479. While the excitation of one plate of discriminator 467 is opposite in phase to the excitation of the other plate, the excitation on the grids is of the same phase since the grids are tied by a common lead 480. Therefore, depending upon the phase of the signal on the grid, the upper or lower section of the tube will conduct to develop an output which drives thermal time delay device 469.

Thermal time delay device 469 may be of the type described in U.S. Patent No. 2,463,805, issued March 8, 1949 to Polye et al. The embodiment herein is comprised of two identical sections enclosed in an evacuated glass envelope. Each section is comprised of a heater 481 surrounded by a heat conducting but electrical insulating material which has a resistance winding 483 wound upon it. The resistance windings of the two sections are connected to form a normally balanced Wheatstone bridge circuit.

A change in the current through one heater circuit changes the temperature of a corresponding resistance winding, the temperature variation of the resistance being a function of the magnitude of current to the heater and its time of application. The resistance winding has a positive temperature coefficient of resistivity so that as its temperature increases with the application of current to its associated heater, the Wheatstone bridge becomes unbalanced and develops an output at wiper 484.

The rate of increase in output after a heater has been energized is determined by the time constant of the tube, i.e., the interval of time required for the bridge output to build up to a maximum value after an increase in application of control signal and to reduce to a minimum after the signal is decreased or removed. Normally, both heaters are operated at equal current levels, and the bridge formed by the resistors is balanced.

A signal of increasing amplitude at secondary winding 443 will be amplified by preamplifier 465 and applied to the grids of discriminator 467. Depending upon the phase of the signal, the transconductance of one section of the discriminator will increase and of the other decrease. One heater will generate heat and the other will cool as a result of this change in transconductance, unbalancing the Wheatstone bridge so that an output will gradually build up at wiper 484. This output requires an interval of time after the application or increase of the displacement signal to build up to a maximum value, and an interval of time after the removal or decrease of the signal to reduce to a minimum value.

The signal from wiper 484 is applied to amplifier 471 where it is given two stages of amplification and applied by way of a lead 489 to the primary winding 491 of feedback transformer 473 in phase opposition to the input signal at secondary winding 495. The algebraic sum of these signals will be applied by way of lead 496 to secondary winding 461 of mixing transformer 445.

Any change in the signal level at primary winding 491 will lag a change in signal level at secondary winding 495. If the input signal at winding 443 of transformer 439 is increasing as when the aircraft is departing from the predetermined altitude, the signal at secondary winding 495 of transformer 473 is greater than the signal at the primary winding 491. Lead 496 feeds the rate signal, representing the difference between the signals at windings 491 and 495 and, having at this time the same phase as the displacement signal, to mixing transformer 445. The rate signal and displacement signal will have an increased effect in turning the craft back toward the predetermined altitude. If the input signal at winding 443 is decreasing as when the aircraft is approaching the predetermined altitude, the signal at primary winding 491 is greater than and opposite in phase to the signal at secondary winding 495. The resultant rate signal will oppose the displacement signal at secondary winding 461 and tend to turn the craft away from the predetermined altitude as the altitude is approached. The rate of return will depend upon how fast the input signal is decreasing, thereby tending to cause the craft to approach the predetermined altitude asymptotically.

The signal on potentiometer 497 is applied by way of a lead 501 to centering control circuit 421. This circuit takes the craft to the predetermined altitude and overcomes any tendency of the craft to divert from this altitude because of wind, loading, or trim angle.

Centering control circuit 421 is comprised generally of a preamplifier 503, a discriminator 507, a thermal time delay device 509, and a feedback lead 511. The thermal time delay device 509, which may be similar to time delay device 469, is connected to form a balanced bridge circuit.

The displacement signal from lead 431 is fed by way of lead 513 to preamplifier 503 where it is given two stages of amplification and applied to discriminator tube 507. This tube is biased so that one section will show an increase in plate current while the plate current of the other tube section will remain zero. The heating effect of one heater of thermal time delay device 509 will increase and will change the resistance of its corresponding secondary winding. A current flow will, therefore, build up in the unbalanced bridge circuit; and at wiper 515, a signal will build up whose phase relation will be directly related to the phase of the displacement signal. This signal will be added algebraically to the combined displacement and rate signals fed by lead 501, and the signal summation will appear at wiper 515.

The initial capture of the selected altitude is determined by the pitch attitude of the craft when the altitude control is engaged. If this is the proper attitude for the craft, taking into consideration updrafts, downdrafts, the loading of the craft, and other variables at the time the altitude controller is placed in operation, the craft will fly at the desired altitude and inductive device 409 of the altitude responsive device 400 will be centered. The initial attitude, however, may not be correct for exactly riding the predetermined altitude; and other variables, such as updrafts or downdrafts, change in loading due to fuel consumption, etc., may be present which causes the craft to consistently deviate from the desired altitude. Normally, the drift of the craft would stop when a sufficient error signal is developed in inductive device 409 to overcome the divergence. Centering circuit 421 in effect moves the zero reference point to maintain the craft on the predetermined altitude under these variable conditions.

The centering control 421 is a form of integration control which develops a signal whose magnitude is the product of the amplitude of the error signal and its time of duration. This signal can be relatively large even though the altitude error signal is quite small, in fact, too small to operate the channel directly. This integration signal gives a correction until the aircraft is at the desired altitude.

To illustrate the centering control, suppose an out of trim condition exists as the altitude device is engaged. The automatic pilot system will attempt to keep the craft at the desired altitude; but the trim condition tends to lower the craft resulting in the craft flying at a lower altitude. The error signal from inductive device 409 seeks to return the aircraft to the desired altitude, but succeeds only in preventing a further drift from that altitude; in other words, it sets up a balancing force to the out of trim condition; but it is unable to return the airplane to the desired altitude, and the aircraft is displaced from the selected altitude.

The rate of change signal is not sufficiently effective in opposing strong sustained displacement forces, so centering control 421 is employed. The time constant of the thermal time delay device is greater than that used in the rate circuits, and the delay device gives an output to center the airplane on the selected altitude as long as an input to the device results from the craft being displaced from the desired altitude.

By providing automatically a control effect equal to that required to reduce the distance between the craft and the desired altitude, the center control brings the craft to the desired altitude and holds it there despite changes in wind condition, loading, and other factors influencing the flight.

The centering circuit becomes active the instant that the altitude controller is turned on. Therefore, should the aircraft spend equal time above and below the selected altitude, the temperature of the thermal time delay heaters is equalized and no appreciable output develops from the centering device. Should a sustained force keep the craft above or below the desired altitude, the output from the centering device builds up to correct for the sustained force.

When it becomes necessary to fly the aircraft at a different altitude, the altitude control system is rendered ineffective, the craft maneuvered to the new altitude and the altitude control system again made effective. Since the centering circuit has a long time constant, it is necessary to return the bridge output to a null position as soon as possible; otherwise a transient signal will appear at the centering circuit and result in the craft flying off the predetermined altitude until the error signal from inductive device 409 will have driven the bridge output to a null.

A feedback is formed by lead 511 from wiper 515 to the input of amplifier 503 to balance the bridge network of centering circuit 421. This loop is open circuited when the craft is being controlled by the altitude control system and is closed when the system is in the standby and off positions. The circuit is so arranged that the output signal from wiper 515 is in phase opposition to the input signal to amplifier 503. Thus for any input signal of given amplitude and phase, discriminator 507 develops an output which applied to thermal time delay device 509 causes to develop at wiper 515 an output voltage whose phase is in opposition to the input signal voltage. Feeding this output back to the input will reverse the operation of discriminator 507 which in turn will tend to drive the output signal to the opposite phase. As the amplitude of this output signal decreases, the plate currents approach a balanced condition, becoming balanced as the output drops to zero. At this time, no current flows through the heaters of thermal time delay device 509 and no output develops at wiper 515. Any other signals or unbalance also present in the coupler are nulled.

The signal from wiper 515 is applied by way of a lead 525 to an amplifier 527 for the converter limiter circuit which may be generally similar to that described in copending application Serial No. 465,515, now Patent 2,864,001, which is a division of application Serial No. 117,476, now abandoned, assigned to the assignee of the present invention. The output of amplifier 527 by way of a coupling transformer 529 is impressed across resistor 531. One terminal of resistor 531 is connected by way of a lead 533 to the center tap 534 of a secondary winding 535 of transformer 536. The end terminals of this winding are connected to the cathode and anode of two sections of a twin rectifier tube 537. A potentiometer 541 is connected across the outputs of tube 537 to form a bridge.

When no signal appears at lead 533, the excitation of the primary winding 543 of transformer 536 will induce in each half of the secondary winding 535 voltages of opposite phase in relation to center tap 534. Each section of tube 537 will act as a rectifier and conduct on the same half-wave of excitation voltage; one section conducting positive-going waves and the other section is conducting negative-going waves. The bridge circuit formed by the secondary winding 535, tube 537 and potentiometer 541 will be balanced so no potential difference will exist between center tap 534 and wiper 544. Therefore, no voltage output appears at lead 543'.

When an alternating current signal of one phase and magnitude is transmitted to center tap 534 by way of lead 533, it will combine algebraically with the two voltages induced in secondary winding 535 by primary winding 543: the voltage in one of the secondary winding sections formed by center tap 534 being increased and the other decreased. Therefore, more current will flow in one section of the twin rectifier tube 537 than in the other; establishing a direct current potential of one polarity between the center tap 534 and wiper 544; an alternating current signal of opposite phase will reverse the polarity of the direct current potential. Thus, the polarity of the direct current at wiper 544 is based upon the phase relation of the alternating current signal and its magnitude is based upon the amplitude of the alternating current signal. The wiper 544 is movable on potentiometer 541 to balance the bridge circuit for zero signal conditions.

Secondary winding 551 of transformer 536 supplies an alternating current to the grids of converter limiter tube 545. Both sections of tube 545, when no signal is applied to its grids, create voltages in the primary winding 553 of coupling transformer 555. Since these voltages are equal in magnitude and opposite in polarity, no current flows in the secondary winding 557. A direct current voltage of one polarity from tube 537, however, increases the transconductance of one section of tube 545 and decreases the transconductance of its other section, so that an alternating current of one phase relation predominates at the secondary winding 557 of transformer 555. A direct current signal of opposite polarity will provide a signal of opposite phase relation at the secondary winding.

The limiting action of tube 545 is based upon the degenerative effect of its cathode resistor 559. The increase in transconductance of one section of the tube 545 that results from an increasing direct current signal to the tube will balance the decrease in transconductance of the opposite section, and the current flow through cathode resistor 559 will remain constant as long as the direct current signal does not exceed design limits. When the design limit is exceeded, one tube section will approach a cut-off condition and the other tube section will approach saturation, thus tending to increase the value of current flowing through the resistor 559 to the plates of tube 545. Such an increase will result in increased grid bias on the two grids of the tube, thus decreasing the flow of current in the tube section that is conducting and thereby causing a limiting action.

The output of the converter limiter 545 appears as an alternating current signal across the resistor 561 of secondary winding 557 of transformer 555. This signal is applied to the grids of alarm amplifier 427 and isolation amplifier 565.

With the coupler in operation the plate current of alarm tube 427 acts to energize relay 567. When a signal greater than a predetermined magnitude appears across resistor 561, it causes the tube 427 to draw grid current, and thereby cause a drop in plate current, and relay 567 opens.

The signal applied to isolation amplifier 565 results in an output which is applied to the primary winding 569 of a coupling transformer 570 having a pair of secondary windings 571 and 572. Secondary winding 571 provides the output for the pitch control channel and secondary winding 572 provides the output for the thrust control channel.

Turning now to Figure 5, the various relay connection for operating the control systems of Figures 2, 3 and 4 are shown schematically. For purposes of simplicity, bus bar 600 is shown as being energized with direct current from a suitable source which may be battery 186 although other sources may be used or the contacts energized individually. The ground leads are also shown as a bus bar 601 although it is obvious that each circuit is individually grounded.

The switches, which may be moved by the human pilot, are as follows: a friction switch A, a selector switch B, and a pair of propeller feathering switches C and D. Switch arm E is moved to a closed circuit position automatically by the propeller speed controller 205 when a predetermined propeller speed is exceeded. Friction switch A and selector switch B are comprised of two interlocked sections A1, A2 and B1, B2, respectively.

When friction switch A is moved to a closed circuit position, energy is supplied by way of arm A1 from bus 600 to ground 601 through the windings 260 of the left and right throttle clutches 259. This engages the clutches so that the friction between the clutch faces keeps the throttle position from changing.

Selector switch arm B1 is directly connected to bus 600 and arm B2 is connected to the bus through contacts 603. Thus, to energize arm B2, the automatic pilot system must be engaged. The engagement of contacts 188 of servo switch 189 by manual means as shown in Figure 1 energizes a relay winding 605 which engages contacts 603 so that energy can reach switch arm B2.

The selector switch has three positions: "off," "stand-by," and "on." When selector switch arm B1 and B2 are moved to "stand-by" position, energy is supplied from bus 600 to ground 601 by way of switch arm B1 through a relay 606 which, upon being energized, engages contact 607, 608, 609 and 610. Closing contacts 607 supplies direct current to the tubes of the amplifiers and couplers. Closing contacts 608 supplies alternating current from a suitable source to the amplifiers and to the fixed phase fields of the servomotors. Other contacts must be closed, however, before energy can reach the servomotors.

After contacts 607 have been engaged, the plate voltage in the coupler builds up; and when the plate flow in the coupler circuit is sufficient, relay 567, Figures 4 and 5, is energized thereby engaging contacts 613 and 615. The engagement of contacts 613 energizes a thermal time delay device 617 which after a predetermined interval of time engages contacts 619.

The above process having taken place, when switch arm B is moved to "stand-by" position, bus lead 600 may supply energy through contact 609, contact 603, switch arm B2, contacts 615, 619 and 620, and friction switch A2 to reset relay 621. Reset relay 621 engages contacts 623 so that the relay will not be deenergized when selector arm B2 is moved from "stand-by" to "on" position.

At the same time, relay 621 disengages contact 625 from contact 627 and engages it with contact 629. If contacts 625 and 627 remain engaged after switch arm B2 is moved to "on" from a "stand-by" position, energy will be supplied to a warning light 631 to indicate a malfunctioning of the unit.

It is evident that a number of conditions must be satisfied at the "stand-by" position before the selector switch can be moved to the "on" position without warning light 631 glowing. Before selector arm B2 can be energized, the switch contacts 188 must be closed. The novel coupler must be working properly for a sufficient length of time for alarm relay 567 and time delay device 617 to have become operative. Obviously, if switch arm E has been moved from contact 632 to an accelerated position in engagement with contact 633 or if the friction switch A2 has not been moved to a closed circuit position, an open circuit exists and relay 621 will not be energized. Any one of these conditions can cause warning light 631 to be lighted when the selector switch B is moved to an "on" position.

Assuming that relay 621 is energized and selector switch B is then moved to the "on" position, the foregoing relays remain energized. In addition, energy is applied by way of switch arm B2 and contacts 625 and 629 to relays 640, 642, and 644. Relay 640 disengages contacts 645, Figure 2, and 646, Figure 3, removing the short across the pitch output and thrust output leads, respectively, of coupler unit 401. Relay 642 disengages contact 648 from contact 649 and engages it with contact 650 so that the feedback loop for the centering circuit will be open circuited and the altitude displacement signal will be applied to the input of the centering circuit. Relay 644 engages contacts 653, 655 and 657.

The engagement of contacts 653 permits alternating current to be supplied to servomotors. The engagement of contacts 655 permits the energization of relay 621 to continue when switch arm E is engaged with contact 633 so that the magnetic clutch 285 may be energized for accelerated power. With the engagement of contacts 657, the following magnetic clutches are engaged: clutch 405 in the altitude responsive device 400, the clutch 212 connecting servomotor 209 and propeller speed controller 205, and clutch 219 connecting the speed controller and the follow up. In addition, the engagement of contacts 657 energizes a relay 659.

When energized, relay 659 disengages contacts 661 and 663. These contacts open the circuit from the servo amplifier to the variable phase windings of the synchronizer motors. These motors stop, thereby establishing a reference manifold pressure.

Should a motor fail, the pilot closes an applicable feathering switch C or D, thereby connecting the energizing power relay 668 with bus 600. When energized relay 668 engages contacts 670 and 671. The engagement of contacts 671 energizes a relay 673 which, then, holds the engagement of contacts 670 even though the feathering switch is only momentarily depressed. The engagement of contacts 670 supplies alternating current to energize the primary winding of the power coupling transformer.

When the aircraft reaches the desired altitude, the human pilot trims the craft for straight and level flight. Then he moves switch 189 to an "on" position, engaging contacts 188. This energizes relay 605 and solenoid 185. Energizing relay 605 closes contacts 603 so that energy can be supplied to selector switch arm B2. Energizing solenoid 185 engages the faces of clutch 101 so that servomotor 99 and elevator surface 103 are operably connected. Any deviation of the craft from the trim attitude which existed at the time switch 189 is moved to the "on" position develops a corresponding signal at inductive device 105 to cause servomotor 99 to displace elevator surface 103 to return the craft to this attitude.

Selector switch B is moved from "off" to "stand-by"

position. This energizes relay 606 which closes contacts 607, 608, 609 and 610 so that direct current is supplied to coupler unit 401, the throttle servos and propeller speed controller amplifiers, and alternating current supplied to the servo amplifiers, the coupler unit, and the manifold pressure synchronizer motors.

After the filaments and heater units of the amplifier tubes in the coupler unit and the servo amplifiers have "warmed up," the pilot moves selector switch B1 to an "on" position. This energizes the coils of the magnetic clutches of the altitude controller, the throttle and propeller speed controller servomotors.

Engaging clutch faces 405 of the altitude controller 400 establishes the reference altitude at which the craft is to fly. Disconnecting the variable phase windings of the synchronizing servomotors from their amplifier establishes a reference manifold pressure.

Any deviation from the reference altitude develops at inductive device 409 a corresponding signal which is applied across resistor 420 of coupler unit 401.

Should the aircraft, due to a change in trim or a downdraft, fall below the predetermined altitude, the displacement signal is fed by way of secondary winding 441 of transformer 439 to primary winding 457 of transformer 445 and by way of secondary winding 443 of transformer 439 to secondary winding 461 of transformer 445. The signal is greater at secondary winding 495 than the signal at primary winding 491 at this time. Subsequently, action in the novel coupler amplifies the signal from potentiometer 497 and through the throttle and elevator amplifiers operates to give an "up-elevator" and advanced throttle action to take the aircraft toward the predetermined altitude without a change in airspeed.

As the plane moves more directly toward the predetermined altitude, thereby increasing its rate of approach, the signal at secondary windings 441 and 443 will decrease at a faster rate. The value of the signal at primary winding 491 will have become greater than the signal at secondary winding 495. The rate of return of the aircraft to the altitude level will decrease when the elevator displacement is reduced and the propeller speed retarded as a signal at primary winding 491 increases and the signal at primary winding 457 decreases. The signals at lead 501 result in a decreased rate of approach until the craft crosses the altitude level and the signal at primary winding 457 and secondary winding 461 are in phase for a short time. Their sum will provide an increased signal to turn the craft back to the altitude level by giving proper elevator and throttle adjustment.

Normally, the time spent above and below the altitude level will be such that the centering signal from centering circuit 421 is effectively cancelled. Should the aircraft persist in hanging above or below the predetermined altitude, the output of centering circuit 421 will act to unbalance the output circuit of that time delay device 509 and so provide the necessary elevator and throttle corrections to bring the craft to the predetermined altitude. Since the time of build-up of the signal from the centering circuit is much longer than the signal build-up of the rate circuit, the centering circuit provides a long-period compensating effect for sustained fluctuations of the craft.

When the craft is on the predetermined altitude, the coupler output is zero. The elevator is controlled by the pitch channel of the automatic pilot and propeller speed and throttle settings are maintained at their engaged positions. While the airspeed and attitude of the airplane are thus maintained as long as the craft is at the desired altitude, any deviation from this altitude will result in the application of corrective control.

Should an engine fail, the human pilot moves a feathering switch C or D to a closed circuit position. This feathers the propeller by a suitable means well known in the art and at the same time energizes a relay 668 whereby an alternating current drives the speed controller to its maximum position.

The foregoing has described a novel control system which corrects for deviations of the craft from a predetermined altitude level by coordinately controlling the pitch attitude and airspeed, the thrust being controlled as a function of the displacement of the craft from a predetermined altitude. Provision is made in the novel system for increasing the thrust on an engine during an emergency condition such as that caused by feathering of a propeller. Provision is also made for manually setting the schedule of manifold pressure and propeller speed prior to placing the system into operation, and for changing the schedule at high propeller speeds.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. A control system for an aircraft having engines for driving its propellers, comprising controller means for controlling the speed at which said engines drive the propellers, means responsive to said first-named means for controlling the manifold pressures of the engines, propeller feathering means, and means operated by the propeller feathering means for actuating said first-named means to order maximum propeller speed of the remaining propellers when a propeller is feathered.

2. A control system for an aircraft having engines for driving its propellers, comprising controller means positionable for controlling the speed at which said engines drive the propellers, means responsive to the position of said controller means for controlling the manifold pressures of the engines, means for selectively operating said controller means manually and automatically, and means for synchronizing said second-named means with the manifold pressure of the engines when said controller means is being manually positioned to effect smooth transition from manual to automatic control.

3. A control system for an aircraft having engines for driving its propellers, comprising controller means positionable for controlling the speed at which said engines drive the propellers, means operable in response to the position of said controller means for controlling the manifold pressures of the engines, means for developing a signal corresponding to the displacement of said aircraft from a predetermined constant altitude level, means operable for positioning said controller means, and means transmitting said signal to said controller positioning means for actuating the controller means and including means for modifying said signal as a function of the rate of change and integral thereof.

4. An altitude control system for an aircraft having engines for driving its propellers, comprising a controller positionable for controlling the speed at which said engines drive the propellers, means operable for positioning said controller, means responsive to the position of said controller for controlling the manifold pressures of the engines, means for developing a signal corresponding to the displacement of said aircraft from a selected predetermined constant altitude level, and means adapted for coupling said signal to said first-named means for operating the latter including means for modifying said signal by deriving signals from said displacement signal corresponding to the rate of change thereof and integral thereof and combining these signals with said displacement signal.

5. A control system for an aircraft having engines for driving its propellers, comprising a controller positionable for controlling the speed at which said engines drive the propellers, means operable for positioning said controller, means responsive to the position of said controller for controlling the manifold pressures of the engines, means for developing a signal corresponding to the displacement of said aircraft from a predetermined constant altitude level, and means adapted for coupling said signal to said first-named means for operating the latter including means for modifying said signal, said last-named means including means for deriving a signal corresponding to the rate of change of displacement from said displacement signal, means for deriving a signal corresponding to the time integral of said displacement signal, and means for combining said time integral signal with said displacement signal.

6. An altitude control system for an aircraft having engines for driving its propellers, comprising a controller positionable for controlling the speed at which said engines drive the propellers, means actuable for positioning said controller, means responsive to the position of said controller for controlling the manifold pressures of the engines, means for developing a signal corresponding to the displacement of said aircraft from a selected predetermined constant altitude level, and means adapted for coupling said signal to said first-named means for actuating the latter including means for modifying said signal, said last-named means including means for compensating for sustained displacements of said craft from said altitude level.

7. A system for controlling attitude and thrust apparatus for flying an aircraft at a predetermined altitude, comprising means for developing signals corresponding to displacement of said craft from the predetermined altitude, means adapted for coupling said signals to the control apparatus for actuating the latter including means for modifying said signal, said last-named means including means for deriving a signal corresponding to the rate of change of displacement from said displacement signal, means for deriving a signal corresponding to the time integral of said displacement signal, and means for combining said signals with said displacement signal to actuate the control apparatus.

8. A control system for an aircraft comprising means for developing signals corresponding to displacement of said craft from a predetermined altitude, means adapted for coupling said signals to control apparatus for actuating the latter including means for modifying said signals, said last-named means including means for compensating for sustained displacements of said craft from said predetermined altitude, and switching means for rendering said compensating means ineffective during changes from one predetermined altitude to another.

9. A control system for an aircraft having attitude and thrust control apparatus, comprising means for developing a signal corresponding to displacement of said craft from a predetermined constant altitude level, and means adapted for coupling said signal to the control apparatus for actuating the latter including means for modifying said signal, said last-named means including a thermally responsive integrating means for compensating for sustained displacements of said craft from said predetermined altitude level.

10. A control system for an aircraft having attitude and thrust control apparatus, comprising means for developing signals corresponding to displacement of said craft from a predetermined altitude, means adapted for coupling said signals to the control apparatus for actuating the latter including means for modifying said signal, said last-named means including a thermally responsive integrating means for compensating for sustained displacements of said craft from said predetermined altitude, and means for driving said compensating means to a null during changes from one predetermined altitude to another.

11. A control system for an aircraft having engines for driving its propellers, comprising a controller positionable for controlling the speed at which said engines drive the propellers, means actuable for positioning said controller, means responsive to the position of said controller for controlling the manifold pressures of the engines, means for developing a signal corresponding to the displacement of said aircraft from a predetermined constant altitude level, means for controlling the pitch attitude of said aircraft, and means adapted for coupling said signal to said first-named means and said pitch attitude control means for the actuation thereof including means for modifying said signal as a function of the time of displacement of the craft from the predetermined altitude.

12. A control system for an aircraft having a plurality of engines for driving its propellers and a movable elevator surface for stabilizing its pitch attitude, comprising a controller positionable for controlling the speed at which said engines drive the propellers, a servomotor for positioning said controller, means responsive to the position of said controller for positioning the throttles of said engines, means responsive to the manifold pressures of said engines for opposing the positioning of said throttles whereby the position of said throttles with reference to the position of said controller corresponds to a predetermined schedule of manifold pressures, a servomotor for moving said elevator surface, means for developing a signal corresponding to the displacement of the aircraft from a predetermined altitude, means responsive to said displacement signal for developing signals corresponding to the rate of change of said displacement signal, means responsive to said displacement signal for developing a signal corresponding to the time integral of said displacement signal, means for combining said signals, and means for controlling said servomotors by said combined signals.

13. A control system for an aircraft having a plurality of engines for driving its propellers and a movable elevator surface for stabilizing its pitch attitude, comprising displaceable means for controlling the speed at which said engines drive the propellers, a servomotor for positioning said displaceable means, means responsive to the position of said displaceable means for positioning the throttles of said engines, means responsive to the manifold pressures of said engines for opposing the positioning of said throttles whereby the position of said throttles with reference to the position of said displaceable means corresponds to a predetermined schedule of manifold pressures, power means for moving said elevator surface, control means for said power means including means for developing a signal corresponding to the displacement of the aircraft from a predetermined altitude, means responsive to said displacement signal for developing signals corresponding to the rate of change of said displacement signal, means responsive to said displacement signal for developing a signal corresponding to the time integral of said displacement signal, means for combining said signals, and means for controlling said servomotor and said power means by said combined signals, said displaceable means being selectively manually or automatically controlled, and synchronizing means for the control means whereby a smooth transition is made from manual to automatic control.

14. A control system for an aircraft having a plurality of engines comprising a controller movable from one position to another, a first motor for positioning said controller, means responsive to the position of said controller for developing a corresponding control signal, second motor means responsive to the control signal for positioning the throttles of said engines, means responsive to the manifold pressure of each of said engines for developing a corresponding signal, means transmitting each of said signals in opposed relationship to the control signal to said second motor means to operate the latter, means responsive to displacement of the craft from a predetermined altitude level for developing a corresponding signal, and means transmitting said altitude signal to said first motor for operating the latter.

15. A control system for an aircraft having a plurality of engines for driving its propellers and a movable elevator surface for controlling its pitch attitude, a controller positionable for controlling the speed at which said engines drive the propellers, a motor for positioning said controller, power means for positioning said elevator surface, reference means responsive to displacement of the craft from a predetermined altitude level for developing an error signal corresponding to the displacement, and means for operating said motor and power means by said signal, said last named means including means for developing an additional signal for said motor and power means when the craft is displaced from said altitude level for a sustained period of time.

References Cited in the file of this patent

UNITED STATES PATENTS

| | | |
|---|---|---|
| 1,978,863 | Gregg et al. | Oct. 30, 1934 |
| 2,496,294 | Kellogg | Feb. 7, 1950 |
| 2,551,979 | Sparrow | May 8, 1951 |
| 2,601,902 | Wells et al. | July 1, 1952 |
| 2,626,767 | Bromley | Jan. 27, 1953 |
| 2,632,142 | Chenery | Mar. 17, 1953 |
| 2,652,896 | Chudyk et al. | Sept. 22, 1953 |
| 2,665,861 | MacCallum et al. | Jan. 12, 1954 |
| 2,667,150 | Coar | Jan. 26, 1954 |
| 2,676,770 | Schuck | Apr. 27, 1954 |
| 2,678,178 | MacCallum | May 11, 1954 |
| 2,833,355 | Reggio | May 6, 1958 |

FOREIGN PATENTS

| | | |
|---|---|---|
| 677,752 | Great Britain | Aug. 20, 1952 |
| 683,354 | Great Britain | Nov. 26, 1952 |